US012722174B2

(12) United States Patent
Choe

(10) Patent No.: US 12,722,174 B2
(45) Date of Patent: Sep. 1, 2026

(54) PUMP ASSEMBLY

(71) Applicant: YONWOO CO., LTD., Incheon (KR)

(72) Inventor: Seong Ung Choe, Incheon (KR)

(73) Assignee: YONWOO CO., LTD., Incheon (KR)

( * ) Notice: Subject to any disclaimer, the term of this patent is extended or adjusted under 35 U.S.C. 154(b) by 90 days.

(21) Appl. No.: 18/576,251

(22) PCT Filed: Jul. 21, 2022

(86) PCT No.: PCT/KR2022/010692
§ 371 (c)(1),
(2) Date: Jan. 3, 2024

(87) PCT Pub. No.: WO2023/003387
PCT Pub. Date: Jan. 26, 2023

(65) Prior Publication Data

US 2025/0083167 A1 Mar. 13, 2025

(30) Foreign Application Priority Data

Jul. 21, 2021 (KR) ........................ 10-2021-0095638
Oct. 22, 2021 (KR) ........................ 10-2021-0141652

(51) Int. Cl.
*B05B 11/10* (2023.01)

(52) U.S. Cl.
CPC ...... *B05B 11/1074* (2023.01); *B05B 11/1025* (2023.01)

(58) Field of Classification Search
CPC ..... B05B 11/00; B05B 11/1074; B65D 83/14; B65D 83/16; B65D 83/24; B65D 83/26; F04F 3/00; F04F 5/00; F04F 5/10
(Continued)

(56) References Cited

U.S. PATENT DOCUMENTS 4,455,923 A * 6/1984 Muller .................. F15B 15/223 91/394
4,819,746 A * 4/1989 Brown .................. E21B 44/005 175/215

(Continued)

FOREIGN PATENT DOCUMENTS

CN 101909479 A 12/2010
CN 111169800 A 5/2020

(Continued)

*Primary Examiner* — David P Angwin
(74) *Attorney, Agent, or Firm* — Bridgeway IP Law Group, PLLC; Sang Ho Lee; Hyun Woo Shin

(57) ABSTRACT

A pump assembly is provided according to an embodiment of the present invention. The pump assembly may comprise: a cylinder having a suction port formed through the lower end thereof; a piston ascended and descended inside the cylinder and having an inlet formed through one side thereof; a seal cap ascended and descended inside the cylinder, in a state of coming into close contact with the inner wall of the cylinder, to open and close the inlet; a stem coupled to the piston in such a way as to be ascended and descended together with the piston and having an outlet formed on top thereof; a cylinder cap coupled to the upper side of the cylinder to surround the stem; a first elastic member disposed between the seal cap and the stem inside the cylinder; and a second elastic member disposed between the cylinder cap and the stem outside the cylinder.

14 Claims, 10 Drawing Sheets

(58) Field of Classification Search
USPC ........................................................ 222/383.1
See application file for complete search history.

(56) References Cited

U.S. PATENT DOCUMENTS

| | | | | |
|---|---|---|---|---|
| 5,363,993 | A * | 11/1994 | Mascitelli ........... | B05B 11/1074 222/321.9 |
| 6,223,954 | B1 | 5/2001 | Carow | |
| 6,419,125 | B1 * | 7/2002 | Kim ...................... | B05B 11/105 222/321.2 |
| 6,685,062 | B1 * | 2/2004 | Ki ....................... | B05B 11/1025 222/321.9 |
| 2010/0288856 | A1 * | 11/2010 | Lee ..................... | B05B 11/1047 239/574 |
| 2013/0230423 | A1 * | 9/2013 | Faneca Llesera ... | B05B 11/1074 92/248 |
| 2014/0008394 | A1 * | 1/2014 | Hofte .................... | B05B 11/043 222/211 |
| 2014/0113970 | A1 * | 4/2014 | Desai ................... | A61K 9/0014 514/567 |
| 2019/0091710 | A1 * | 3/2019 | Knight ................ | B05B 11/1074 |

FOREIGN PATENT DOCUMENTS

| | | | | | |
|---|---|---|---|---|---|
| CN | 120520792 | A | * | 8/2025 | ................ F04F 3/00 |
| EP | 0983123 | B1 | | 3/2003 | |
| EP | 2759490 | B1 | | 8/2016 | |
| EP | 3426411 | B1 | | 9/2020 | |
| JP | H06-191571 | A | | 7/1994 | |
| JP | H09-57158 | A | | 3/1997 | |
| JP | 3068621 | U | | 5/2000 | |
| JP | 2002-500559 | | * | 1/2002 | ............. B05B 11/00 |
| JP | 2002-500559 | A | | 1/2002 | |
| JP | 2014-532013 | A | | 12/2014 | |
| KR | 20-0435901 | Y1 | | 3/2007 | |
| KR | 10-1233080 | B1 | | 2/2013 | |
| KR | 101233080 | | * | 2/2013 | ......... B05B 11/1069 |
| KR | 10-2015-0112650 | A | | 10/2015 | |
| KR | 10-2016-0097607 | A | | 8/2016 | |
| KR | 10-2186042 | B1 | | 12/2020 | |
| KR | 102186042 | | * | 12/2020 | ............. B05B 11/00 |
| KR | 10-2206983 | B1 | | 1/2021 | |
| KR | 102206983 | | * | 1/2021 | ............. A45D 34/04 |
| KR | 10-2021-0047557 | A | | 4/2021 | |
| KR | 10-2271374 | B1 | | 6/2021 | |

* cited by examiner

PUMP ASSEMBLY

TECHNICAL FIELD

The present invention relates to a pump assembly.

BACKGROUND ART

Generally, a spray container is a container that can spray a fluid stored therein if a spray button is pressurized by a user, and in this case, the spray container is widely used for spraying liquid cosmetic or medicinal products.

A conventional spray container includes a pump assembly and an orifice for spraying. The conventional pump assembly consists of a cylinder, a piston, a seal cap, and a stem. In this case, an elastic member is located between the seal cap and the cylinder, and another elastic member is located between the seal cap and the stem, so that as the two elastic members are located inside the cylinder, the seal cap selectively opens and closes the inlet of the piston by means of the elastic forces of the two elastic members. In this case, however, the plurality of elastic members are located inside the cylinder, thereby making it hard to design and couple the parts of the pump assembly and failing to have appropriate supports inside the cylinder.

Besides, the pump assembly is generally made of a plastic material such as PP, PE, and the like, but the springs of the pump assembly are made of a metal material, thereby causing difficulties in separate collection thereof.

DISCLOSURE

Technical Problem

Accordingly, the present invention has been made in view of the above-mentioned problems occurring in the related art, and it is an object of the present invention to provide a pump assembly.

The technical problems to be achieved through the present invention are not limited as mentioned above, and other technical problems not mentioned herein will be obviously understood by one of ordinary skill in the art through the following description.

Technical Solution

A pump assembly is provided according to an embodiment of the present invention. The pump assembly may comprise: a cylinder having a suction port formed through the lower end thereof; a piston ascended and descended inside the cylinder and having an inlet formed through one side thereof; a seal cap ascended and descended inside the cylinder, in a state of coming into close contact with the inner wall of the cylinder, to open and close the inlet; a stem coupled to the piston in such a way as to be ascended and descended together with the piston and having an outlet formed on top thereof; a cylinder cap coupled to the upper side of the cylinder to surround the stem; a first elastic member disposed between the seal cap and the stem inside the cylinder; and a second elastic member disposed between the cylinder cap and the stem outside the cylinder.

Further, the first elastic member may be an elastic body having the shape of a post with a hollow portion formed therethrough in such a way as to surround at least one of the piston and the stem.

Furthermore, if the pump assembly is pressurized, the second elastic member may be compressed to allow the piston and the stem to move down, so that as the first elastic member is compressed, the seal cap may move up relative to the piston to allow the inlet to be exposed.

Besides, the first elastic member may be made of at least one of thermoplastic polyolefin (TPO) and thermoplastic elastomer (TPE).

Moreover, the second elastic member may be a spring made of a plastic material by means of injection molding.

Additionally, the second elastic member may include: an upper support body; a lower support body located under the upper support body; and elastic bodies for connecting the upper support body and the lower support body to each other, while each having a given inclination, in such a way as to be curvedly deformed when the upper support body is pressurized.

Further, the second elastic member may be a bellows type elastic member whose peaks and troughs are alternatingly formed in a longitudinal direction thereof.

Furthermore, the stem may include: a stem body coupled to the cylinder and having the outlet formed on top thereof; and a support body coupled to the outer periphery of the stem body and having a stem wing extending outward therefrom to support top of the second elastic member.

Moreover, the stem wing may include at least one or more air entrance holes formed thereon to pass air therethrough when the second elastic member is compressed or released from the compressed state.

Further, the stem wing may have a first support groove formed along the periphery of the underside thereof to support top of the second elastic member, and the cylinder cap may have a second support groove formed along the periphery of top thereof to support underside of the second elastic member.

Furthermore, the pump assembly may further include a valve having a blocking ball located on the suction port to allow the suction port to selectively communicate with the outside.

Further, the valve may further include a valve shaft extending upward from the blocking ball, and the piston comprises a guide extending downward from the underside thereof, the guide having at least a portion passing therethrough in a longitudinal direction of the piston so that when the piston or the valve is ascended and descended, the valve is inserted into the guide.

Furthermore, the valve may further include at least one or more valve wings protruding outward from the valve shaft in such a way as to come into contact with the inner peripheral wall of the cylinder and support the side periphery thereof.

Further, the valve wings may be spaced apart from one another along the periphery of the valve shaft in such a way as to move the content of a container body through spaces thereamong.

Advantageous Effects of Invention

According to the present invention, even though only one elastic member is located inside the cylinder, the spraying operation of the pump assembly is easily performed, so that the coupling structure of the pump assembly is simplified and the coupled parts of the pump assembly are easily separated and recycled.

According to the present invention, further, the elastic member disposed inside the cylinder is made of at least one of thermoplastic polyolefin (TPO) and thermoplastic elastomer (TPE), and in this case, even though a separate physical structure for making the elastic member easily deformed is not provided, the elastic member is easily deformed, while generating an elastic force readily. Further, the elastic member is not made of a metal material, thereby solving the separate collection problem thereof to provide an eco-friendly product.

According to the present invention, furthermore, the ascending and descending operations of the piston or the valve are guided by the guide, thereby improving the operating structure of the pump assembly.

According to the present invention, besides, the valve is provided with the valve wings adapted to constantly maintain the position thereof and to guide the ascending and descending operations thereof, thereby improving the operation structure thereof.

According to the present invention, further, the stem consists of the stem body and the support body coupled to each other, thereby making the parts of the pump assembly easily coupled to one another.

BRIEF DESCRIPTION OF DRAWINGS

To allow the drawings as will be mentioned in the description of the present invention to be more sufficiently understood, the brief description of the drawings may be provided.

MODE FOR INVENTION

Figure 1:
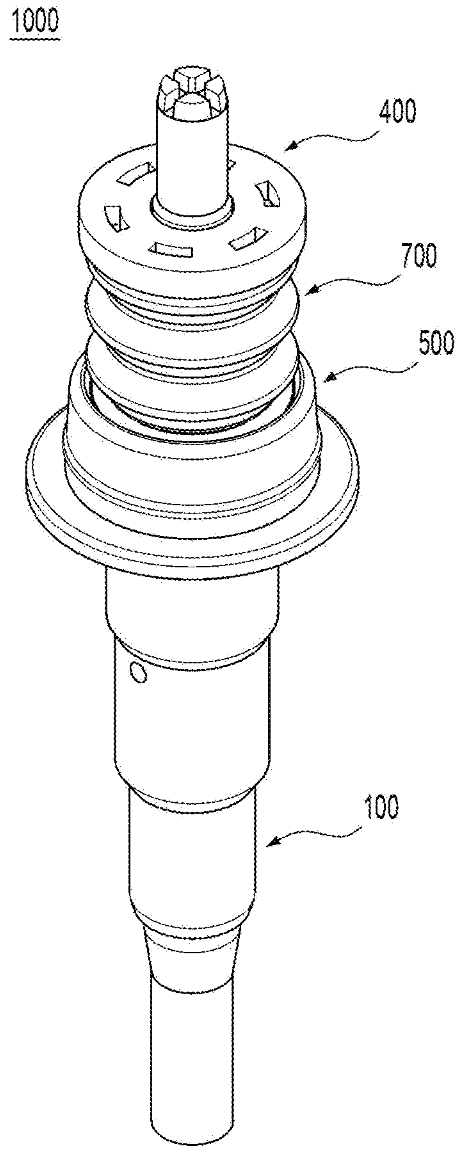
FIG. 1 is a perspective view showing a pump assembly according to an embodiment of the present invention.

Hereinafter, example embodiments will be described with reference to the accompanying drawings. In addition, a device of the present invention and a method for using the device will be explained in detail with reference to the attached drawings. In the drawings, the same reference numerals or symbols are parts or components performing the same functions. Further, top, bottom, left and right directions as will be described below are determined with reference to the drawings, and accordingly, the scope of the present invention is not necessarily restricted to the corresponding directions.

Terms, such as the first, the second, and the like, may be used to describe various elements, but the elements should not be restricted by the terms. The terms are used to only distinguish one element from the other element. For example, a first element may be named a second element without departing from the scope of the present invention. Likewise, a second element may be named a first element. A term 'and/or' includes a combination of a plurality of relevant and described items or any one of a plurality of related and described items.

Terms used in this application are used to only describe specific exemplary embodiments and are not intended to restrict the present invention. An expression referencing a singular value additionally refers to a corresponding expression of the plural number, unless explicitly limited otherwise by the context. In this application, terms, such as "comprise", "include", or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

In the description, when it is said that one element is described as being "connected" to the other element, one element may be directly connected or coupled to the other element, but it should be understood that another element may be present between the two elements. When it is said that one portion is described as "includes" any component, further, one element may further include other components unless no specific description is suggested.

The present invention relates to a pump assembly. The pump assembly is coupled to one side of a container body in which content is stored, and when pressurized, the pump assembly sucks the content and then discharges the content to the outside. According to an embodiment of the present invention, when the content is discharged through the operation of the pump assembly, it can be sprayed. However, the present invention may not be limited thereto.

Figure 2:
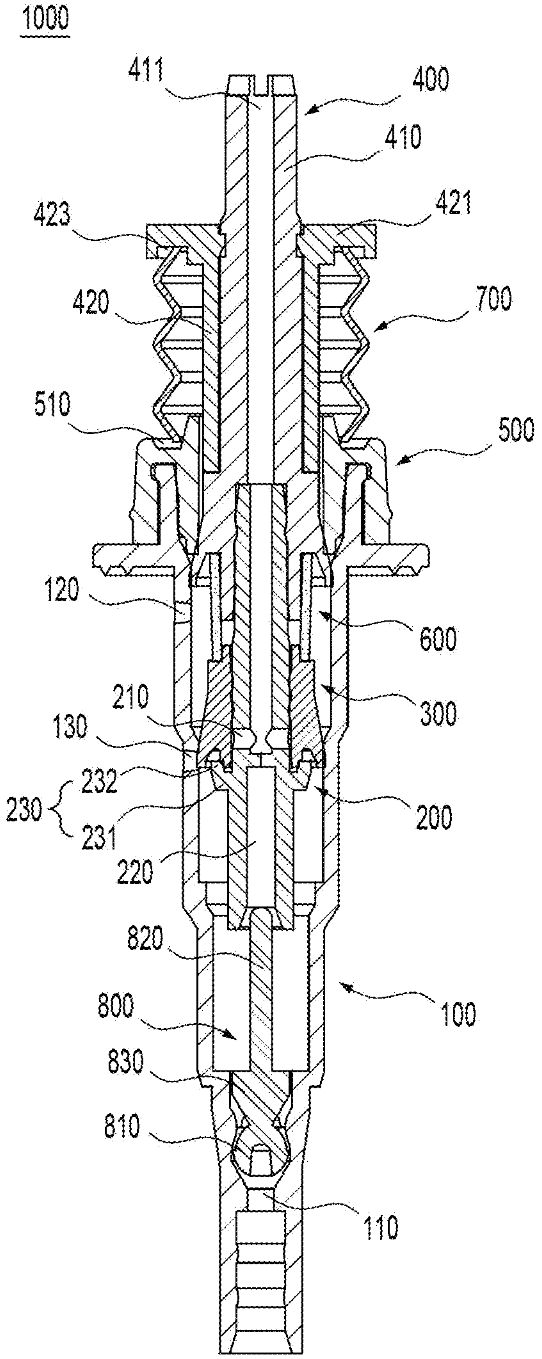
FIG. 2 is a sectional view showing the pump assembly according to the embodiment of the present invention.
Figure 3:
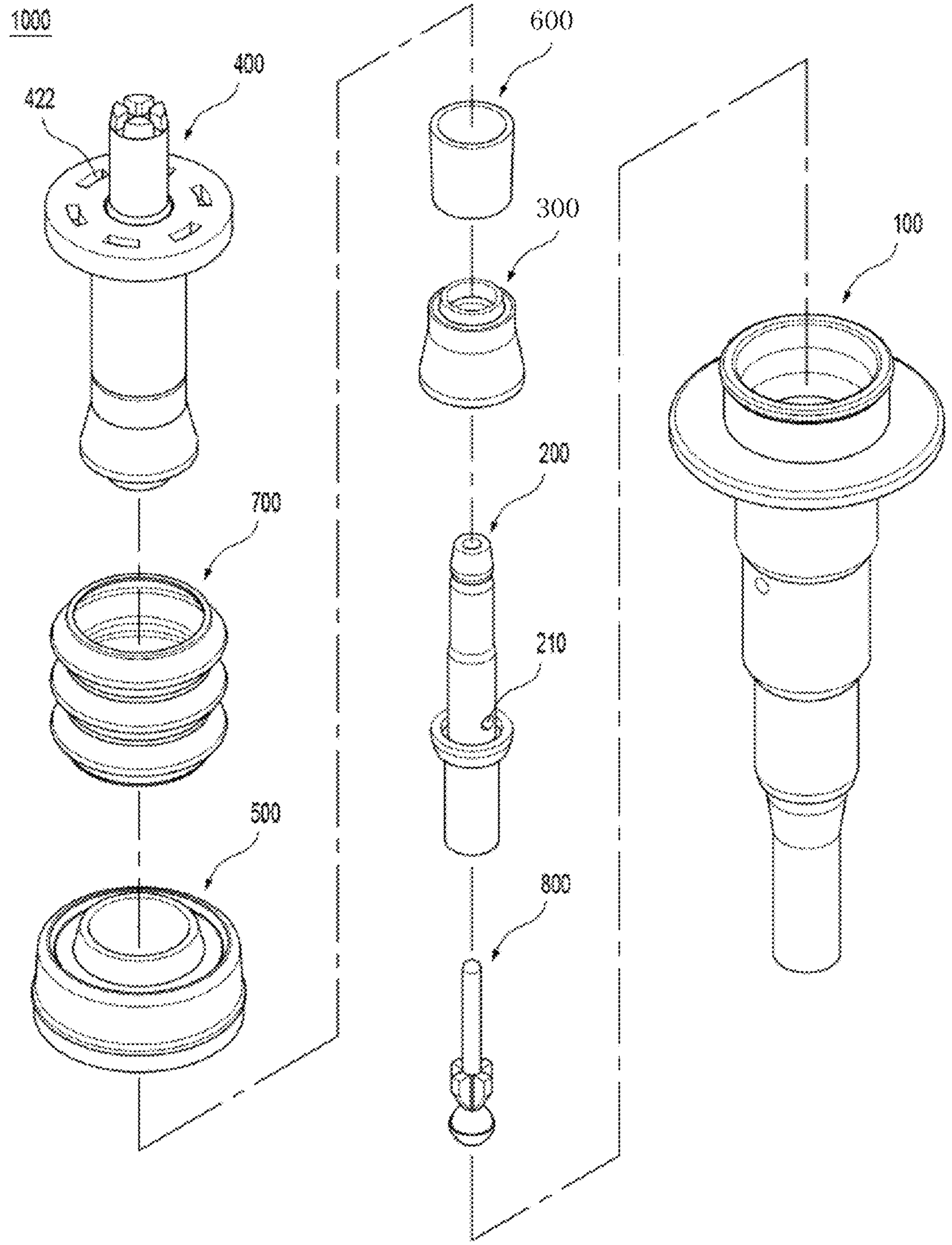
FIG. 3 is an exploded perspective view showing the pump assembly according to the embodiment of the present invention.
Figure 4:
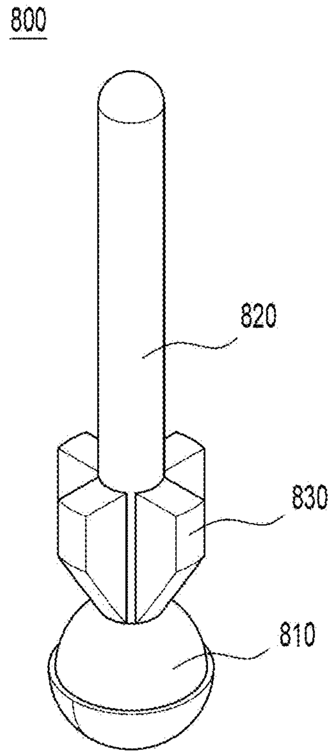
FIG. 4 is a perspective view showing a valve of the pump assembly according to the embodiment of the present invention.
Figure 5:
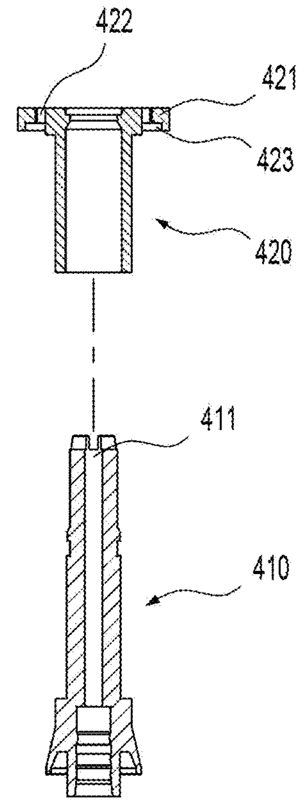
FIG. 5 is an exploded perspective view showing a stem of the pump assembly according to the embodiment of the present invention.

FIG. 1 is a perspective view showing a pump assembly according to an embodiment of the present invention, FIG. 2 is a sectional view showing the pump assembly according to the embodiment of the present invention, FIG. 3 is an exploded perspective view showing the pump assembly according to the embodiment of the present invention, FIG. 4 is a perspective view showing a valve of the pump assembly according to the embodiment of the present invention, and FIG. 5 is an exploded perspective view showing a stem of the pump assembly according to the embodiment of the present invention.

Referring to FIGS. 1 to 5, a pump assembly 1000 according to the embodiment of the present invention includes a cylinder 100, a piston 200, a seal cap 300, a stem 400, a cylinder cap 500, a first elastic member 600, a second elastic member 700, and a valve 800.

The cylinder 100 has the shape of a cylinder open on top and bottom thereof. The cylinder 100 has a suction port 110 formed through the lower end thereof. Through the suction port 110, the interior of the cylinder 100 communicates with the container body in which the content is stored. If the pump assembly 1000 operates, the content of the container body is sucked to the interior of the cylinder 100 through the suction port 110.

In the embodiment of the present invention, the cylinder 100 becomes step by step reduced in inside diameter as it goes toward the lower portion from the upper portion thereof. In the upper portion of the cylinder 100 where the inside diameter of the cylinder 100 is large, the seal cap 300 and the stem 400 are ascended and descended, and in the lower portion of the cylinder 100 where the inside diameter of the cylinder 100 is small, the piston 200 is ascended and descended. In this case, for example, stepped projections are formed on portions where the inside diameter of the cylinder 100 becomes step by step reduced, and thus, the stepped projections limit the ascending and descending ranges of the piston 200, the seal cap 300, and/or the stem 400. However, the present invention may not be limited thereto.

In the embodiment of the present invention, the cylinder 100 has a first air hole 120 and a second air hole 130 formed on one side thereof. The first air hole 120 is formed through the upper side of the side periphery thereof and the second air hole 130 is formed through the side periphery thereof below the first air hole 120. The first air hole 120 and the second air hole 130 serve to offset excessive changes in the internal pressure of the cylinder 100 when the piston 200, the seal cap 300 and/or the stem 400 are descended.

In the embodiment of the present invention, a tube is coupled to the bottom of the suction port 110. The tube extends downward from the suction port 110 to suck the content stored in the bottom of the container body. However, the present invention may not be limited thereto.

The piston 200 extends in a longitudinal direction of the piston assembly and has an inlet 210 formed through one side thereof. For example, the inlet 210 is formed through the side periphery of the piston 200. The content of the cylinder 100 is introduced into the piston 200 through the inlet 210. The piston 200 has at least a portion passing therethrough in the longitudinal direction to allow the content introduced thereinto to be discharged upward through the inlet 210.

The piston 200 is ascended and descended inside the cylinder 100. In this case, as the upper portion of the piston 200 is coupled to the stem 400, the piston 200 is ascended and descended together with the stem 400. That is, if the stem 400 is pressurized downward, the stem 400 and the piston 200 move down together, and if the stem 400 is pressurized upward (by means of the second elastic member 700), the stem 400 and the piston 200 move up together. Accordingly, the volume of the internal space of the cylinder 100 is changed according to the ascending and descending movements of the piston 200, which causes the internal pressure of the cylinder 100 to be changed.

In the embodiment of the present invention, the piston 200 has a guide 220 extending downward from the underside thereof. The guide 220 has at least a portion passing therethrough in the longitudinal direction. When the piston 200 and/or the valve 800 are ascended and descended, the valve 800 (especially, a valve shaft 820) is inserted into the guide 220. That is, as the guide 220 supports the side periphery of the valve 800 (especially, the valve shaft 820), the valve 800 is kept in position and the ascending and descending path of the valve 800 is guided. However, the present invention may not be limited thereto.

The seal cap 300 is ascended and descended inside the cylinder 100 in a state of coming into contact with the inner peripheral wall of the cylinder 100. In detail, if the stem 400 is pressurized downward and moves down, the seal cap 300 moves down. Further, if the stem 400 is pressurized upward and moves up (by means of the second elastic member 700), the seal cap 300 moves up. Accordingly, the volume of the internal space of the cylinder 100 is changed according to the ascending and descending movements of the seal cap 300, which causes the internal pressure of the cylinder 100 to be changed.

Top of the seal cap 300 supports the underside of the first elastic member 600. When the stem 400 moves down, the first elastic member 600 moves down, together with the stem 400, and the seal cap 300 moves down by means of the first elastic member 600. In this case, when the stem 400 moves down, the seal cap 300 indirectly receives the pressurizing force of the stem 400 through the first elastic member 600, the seal cap 300 moves down by a different distance from the downward moving distance of the stem 400. For example, when the stem 400 moves down, the first elastic member 600 is compressed to cause the seal cap 300 to move down by a distance shorter than the downward moving distance of the stem 400.

The seal cap 300 has a plate membrane disposed on the periphery thereof so that it can be ascended and descended inside the cylinder 100, while coming into close contact with the inner peripheral wall of the cylinder 100.

To allow the seal cap 300 to move up together with the stem 400 when the stem 400 moves up, at least a portion of the underside of the seal cap 300 is supported against at least a portion of the piston 200. Accordingly, when the stem 400 moves up through the second elastic member 700, the piston 200 coupled to the stem 400 moves up, and through the upward movement of the piston 200, the seal cap 300 moves up.

In the embodiment of the present invention, the piston 200 has an edge portion 230 protruding outward from the lower side periphery thereof. The edge portion 230 supports the underside of the seal cap 300, and when the piston 200 moves up, the edge portion 230 moves up the seal cap 300. However, the present invention may not be limited thereto.

In the embodiment of the present invention, the edge portion 230 has a base 231 extending outward from the lower periphery of the piston 200 and a pressurizing protrusion 232 extending upward from the base 231 in such a way as to be fitted to the seal cap 300 (especially, the inside of the plate membrane of the seal cap 300). In this case, the pressurizing protrusion 232 is not coupled structurally to the seal cap 300, so that when the piston 200 moves up, the pressurizing protrusion 232 pressurizes the seal cap 300 upward to move up the seal cap 300, but when the piston 200 moves down, the pressurizing protrusion 232 is not descended together with the seal cap 300. However, the present invention may not be limited thereto.

The seal cap 300 serves to open and close the inlet 210 of the piston 200. In detail, the seal cap 300 comes into close contact with at least a portion of the outer peripheral wall of the piston 200 in an initial state thereof to close the inlet 210. If the stem 400 is pressurized downward and thus moves down, the seal cap 300 and the piston 200 move down by means of the stem 400, and in this case, the moving distance of the seal cap 300 is shorter than the moving distance of the piston 200 by means of the compression of the first elastic member 600. That is, the seal cap 300 moves up relative to the piston 200. Through the upward movement of the seal cap 300 relative to the piston 200, the inlet 210 is exposed to the outside. If the inlet 210 is exposed to the outside, the content of the cylinder 100 is introduced into the piston 200 due to the internal pressure of the cylinder 100 that increases by the descending operations of the piston 200 and/or the seal cap 300.

The stem 400 extends in the longitudinal direction of the pump assembly, and at least a portion of the stem 400 is inserted into the cylinder 100, while extending upward therefrom in such a way as to be located outside the cylinder 100. The second elastic member 700 is located in the space between the portion of the stem 400 located outside the cylinder 100 and the cylinder 100.

The lower end of the stem 400 is coupled to the piston 200, and accordingly, the stem 400 is ascended and descended inside the cylinder 100, together with the piston 200. In detail, as the stem 400 is pressurized and thus moves down, it moves down the piston 200, and in this case, the second elastic member 700 is compressed between the cylinder 100 and the stem 400. If the pressurizing force applied to the stem 400 is released, the stem 400 moves up by means of the second elastic member 700, and in this case, the piston 200 also moves up.

The stem 400 is open on top and bottom thereof and has a hollow portion formed in the longitudinal direction. In this case, the stem 400 has an outlet 411 formed on top thereof. The content discharged through the piston 200 is introduced through the open bottom of the stem 400, and the introduced content passes through the interior of the stem 400 and is then discharged through the outlet 411 to the outside.

The stem 400 is ascended and descended in a state of coming into close contact with the inner peripheral wall of the cylinder 100. To do this, a plate membrane is disposed on the outer peripheral surface of the stem 400 in such a way as to come into close contact with the inner peripheral wall of the cylinder 100. For example, the plate membrane is formed on the outer periphery of the bottom of the stem 400 in such a way as to allow an end periphery thereof to slantly protrude downward therefrom. The top periphery of the first elastic member 600 is supported against the inside of the plate membrane (that is, the space between the plate membrane and the outer peripheral surface of the stem 400).

According to the embodiment of the present invention, the stem 400 includes a stem body 410 coupled to the cylinder 100 and having the outlet 411 formed on top thereof and a support body 420 coupled to the outer periphery of the stem body 410 and having a stem wing 421 extending outward therefrom to support top of the second elastic member 700. This is to enhance the conveniences of the coupling process of the pump assembly 1000. In detail, the piston 200, the seal cap 300, the first elastic member 600, and the stem body 410 are coupledly arranged inside the cylinder 100, and after the cylinder cap 500 is coupled to the cylinder 100, the second elastic member 700 is located on top of the cylinder cap 500. Next, the support body 420 is coupled to the outer periphery of the stem body 410. As a result, the coupling process of the pump assembly 1000 is completed. That is, if the stem body 410 and the support body 420 are unitarily formed with each other, it is hard to locate the second elastic member 700 between the stem wing 421 and the cylinder cap 500, but as the support body 420 is coupled to the stem body 410, it is easy to locate the second elastic member 700 between the stem wing 421 and the cylinder cap 500. In this case, the stem body 410 and the support body 420 may be coupled to each other by means of known various coupling methods such as screw-coupling, fitting coupling, and the like.

In the embodiment of the present invention, the stem wing 421 has at least one or more air entrance holes 422 formed thereon to pass air therethrough when the second elastic member 700 is compressed or released from the compressed state. When the second elastic member 700 is compressed, air is discharged to the outside through the air entrance holes 422, and when the second elastic member 700 is released from the compressed state, air is introduced into the inside through the air entrance holes 422. Accordingly, the internal pressure of the second elastic member 700 is constantly kept (if the second elastic member 700 is formed of a bellows type spring whose side periphery is closed).

The cylinder cap 500 is coupled to top of the cylinder 100 in such a way as to surround the stem 400. The cylinder cap 500 serves to prevent foreign substances from entering the space between the stem 400 and the cylinder 100. Further, top of the cylinder cap 500 supports the second elastic member 700.

The first elastic member 600 is located between the seal cap 300 and the stem 400 inside the cylinder 100. The first elastic member 600 is compressed when the stem 400 is pressurized and generates an elastic restoring force to its original state. If the stem 400 is pressurized and thus moves down, the first elastic member 600 is compressed toward the upper side thereof with respect to the bottom of the stem 400, and accordingly, the first elastic member 600 applies the elastic restoring force to the lower side thereof to the seal cap 300.

In the embodiment of the present invention, the first elastic member 600 is an elastic body having the shape of a post. In detail, the first elastic member 600 has a hollow portion formed therethrough in the longitudinal direction and is fitted to the outer peripheral surfaces of the piston 200 and/or the stem 400. In this case, as the first elastic member 600 is compressed, while the inside diameters of top and bottom of the first elastic member 600 are constantly maintained, the inside diameter of the middle portion thereof becomes increasingly deformed, and the elastic restoring force is generated so that the inside diameter of the middle portion of the first elastic member 600 decreases. In this case, the space occupied by the first elastic member 600 inside the cylinder 100 becomes reduced, thereby designing and coupling the first elastic member 600 with ease, providing easy injection molding because of the simple structure of the first elastic member 600, and allowing the first elastic member 600 to have a relatively higher elastic restoring force than elastic members having different shapes. However, the present invention may not be limited thereto.

In the embodiment of the present invention, the first elastic member 600 is made of an elastic plastic material. For example, the first elastic member 600 is made of at least one of thermoplastic polyolefin (TPO) and thermoplastic elastomer (TPE). In this case, even though a separate physical structure for making the first elastic member 600 easily deformed is not provided, the first elastic member 600 is easily deformed, while generating an elastic force readily, and further, the first elastic member 600 is not made of a metal material, thereby solving the separate collection problem thereof to thus provide an eco-friendly product.

The second elastic member 700 is located between the cylinder cap 500 and the stem 400 outside the cylinder 100. The second elastic member 700 is compressed when the stem 400 is pressurized and generates an elastic restoring force to its original state. If the stem 400 is pressurized and thus moves down, the second elastic member 700 is compressed toward the lower side thereof with respect to the cylinder cap 500, and accordingly, the second elastic member 700 applies the elastic restoring force to the upper side thereof to the stem 400.

When the pump assembly 1000 is pressurized, the second elastic member 700 is compressed to allow the stem 400, the seal cap 300, and/or the piston 200 to be descended. As the stem 400, the seal cap 300, and/or the piston 200 are descended, the pressure of the internal space of the cylinder 100 becomes increased.

In the embodiment of the present invention, the second elastic member 700 is the bellows type spring whose peaks and troughs are alternatingly formed. Further, for example, the second elastic member 700 is closed on the side periphery thereof. If the second elastic member 700 is compressed, the distance between the neighboring peaks and the distance between the neighboring troughs are reducedly deformed, and the second elastic member 700 generates the elastic restoring force in a direction of allowing the distances to be returned to their original state. However, the present invention may not be limited thereto.

In the embodiment of the present invention, the second elastic member 700 is made of a soft plastic material by means of injection molding. For example, the material of the second elastic member 700 includes polyetheretherketone (PEEK), polycarbonate (PC), polyoxymethylene (POM), polyketone (POK), polybutylene terephthalate (PBT), polypropylene (PP), polyethylene (PE), polyoxypropylene (POP), polyolefin elastomer (POE), ethylene octene/butene copolymers, or the like. However, the present invention may not be limited thereto. As the second elastic member 700 is made of the soft plastic material, it is made with ease and at a lower production cost than the conventional metal spring. Further, the second elastic member 700 is more lightweight than the conventional metal spring, and accordingly, the weight of a container to which the pump assembly having the second elastic member 700 is coupled is reduced, so that it is easy that it is carried on a user's hand or the like and convenient in use. Further, the second elastic member 700 does not have any separate collection problem from other parts of the pump assembly 1000 to provide an eco-friendly product.

In the embodiment of the present invention, the stem wing 421 has a first support groove 423 formed along the periphery of the underside thereof, and the cylinder cap 500 has a second support groove 510 formed along the periphery of top thereof. Top of the second elastic member 700 is supported against the first support groove 423, and the underside of the second elastic member 700 is supported against the second support groove 510, so that the second elastic member 700 is stably located between the stem wing 421 and the cylinder cap 500.

According to the present invention, even though the second elastic member 700 is located outside the cylinder 100 and only the first elastic member 600 is located inside the cylinder 100, the spraying operation of the pump assembly 1000 is easily performed, so that the coupling structure of the pump assembly 1000 is simplified and the coupled parts of the pump assembly 1000 are easily separated and recycled.

When the pump assembly 1000 is pressurized, the second elastic member 700 is compressed to allow the stem 400, the seal cap 300, and/or the piston 200 to be descended. In this case, the first elastic member 600 is compressed to allow the descended distance of the seal cap 300 to be different from the descended distance of the piston 200. As the descended distance of the seal cap 300 is different from the descended distance of the piston 200, the inlet 210 of the piston 200 is exposed to the outside.

According to the present invention, the content of the container body is discharged upward at a flow rate at which the content can be sprayed by means of the operations of the second elastic member 700 and the first elastic member 600. In detail, if the content is introduced into the piston 200 at the same time when the stem 400 is pressurized, the flow rate of the content is slow so that it is hard to be sprayed. According to the present invention, contrarily, the inlet 210 of the piston 200 is closed when the stem 400 is pressurized, so that the content is not introduced into the piston 200 immediately. In a state where the internal pressure of the cylinder 100 becomes increased sufficiently by means of the compression of the second elastic member 700, the inlet 210 is exposed by means of the compression of the first elastic member 600, so that the content is introduced into the piston 200. In this case, the content is introduced into the piston 200 at a fast flow rate by means of the internal pressure of the cylinder 100.

The valve 800 serves to allow the suction port 110 to selectively communicate with the outside. In detail, the valve 800 blocks the suction port 110 from communicating with the outside, and if a negative pressure is formed in the cylinder 100, the valve 800 allows the suction port 110 to communicate with the outside. If the suction port 110 communicates with the outside, the content of the container body is introduced into the suction port 110.

In the embodiment of the present invention, the valve 800 includes a blocking ball 810 disposed in the suction port 110 and a valve shaft 820 extending upward from the blocking ball 810.

The blocking ball 810 moves up and down according to the internal pressure of the cylinder 100. If the blocking ball 810 moves up, the interior of the cylinder 100 communicates with the outside, and if the blocking ball 810 moves down, the interior of the cylinder 100 is blocked from the outside.

In the embodiment of the present invention, the blocking ball 810 is made of polypropylene (PP). However, the present invention may not be limited thereto.

In the embodiment of the present invention, the blocking ball 810 has at least a portion formed up and down therethrough to provide a hollow portion. In the case where the hollow portion is formed inside the blocking ball 810, the thickness of the blocking ball 810 is kept to a given size or less even though the diameter thereof is over a given size. When polypropylene (PP) is injection-molded to a given thickness, it may shrink, but in this case, the thickness of the blocking ball 810 is kept to the given size or less by means of the formation of the hollow portion, polypropylene (PP) is prevented from shrinking upon the injection molding.

In the embodiment of the present invention, the blocking ball 810 has a thickness of 1 mm or less, desirably a thickness in the range of 0.8 to 1 mm. If the thickness of the blocking ball 810 is over 1 mm, shrinkage upon injection molding may occur, but according to the present invention, the thickness of the blocking ball 810 is less than 1 mm, so that shrinkage of the blocking ball 810 may be prevented. According to the present invention, further, even if the diameter of the blocking ball 810 is over 1 mm, the thickness of the blocking ball 810 is kept less than 1 mm by means of the hollow portion. However, the present invention may not be limited thereto.

The valve shaft 820 extends upward from the blocking ball 810, while at least a portion thereof is being inserted into the guide 220. The guide 220 supports the side periphery of the valve shaft 820, and accordingly, the valve 800 is constantly kept in position.

When the blocking ball 810 moves up and/or the piston 200 moves up, the valve shaft 820 moves up and down inside the guide 220. That is, the upward and downward movement paths of the piston 200 and/or the valve 800 are guided by the guide 220.

In the embodiment of the present invention, the valve 800 further includes valve wings 830 protruding outward from the valve shaft 820. The valve wings 830 come into contact with the inner peripheral wall of the cylinder 100, while supporting the side periphery of the valve 800. Further, the valve wings 830 move up and down along the inner peripheral wall of the cylinder 100, when the valve 800 moves up and down, to guide the upward and downward movement paths of the valve 800.

In the embodiment of the present invention, the valve wings 830 are spaced apart from one another along the periphery of the valve shaft 820. The content moves through the space between the neighboring valve wings 830.

In the embodiment of the present invention, the valve wings 830 become reduced in thickness toward the lower sides thereof, while having given inclinations. Accordingly, the undersides of the valve wings 830 do not come into contact with top of the suction port 110, and when the valve 800 moves up and down, the valve wings 830 easily move up and down, while being not locked onto the suction port 110 of the cylinder 100.

The pump assembly 1000 as shown in FIGS. 1 to 5 is exemplary, and therefore, various configurations may be made according to embodiments of the present invention.

Figure 6:
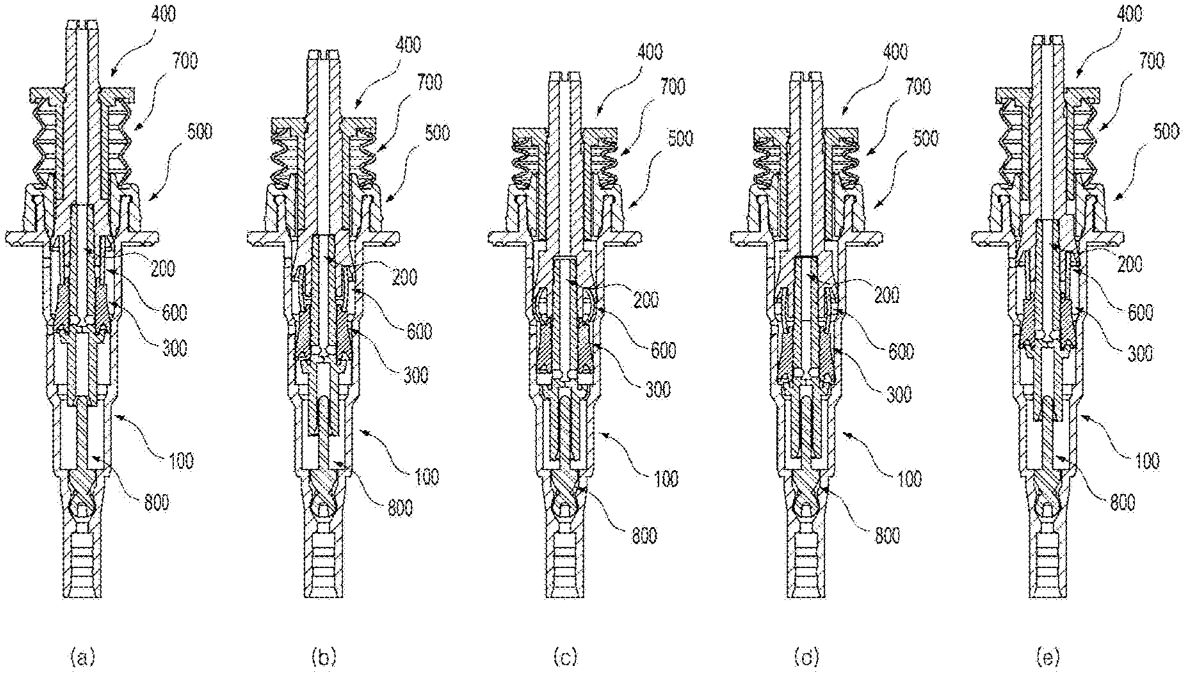
FIG. 6 is a sectional view showing operations of the pump assembly according to the embodiment of the present invention.
Figure 7:
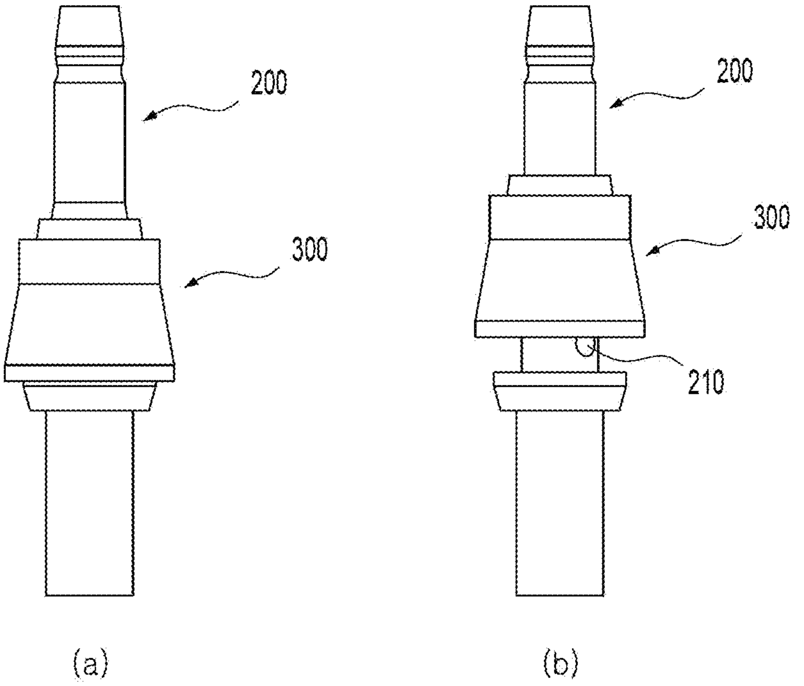
FIG. 7 is a front view showing operations of a piston and a seal cap of the pump assembly according to the embodiment of the present invention.

FIG. 6 is a sectional view showing operations of the pump assembly according to the embodiment of the present invention. FIG. 7 is a front view showing the operations of the piston and the seal cap of the pump assembly according to the embodiment of the present invention. In detail, FIGS. 6*a* to 6*e* are sectional views showing the sequential procedure of the pump assembly from pressurization to the release from the pressurized state. FIG. 7*a* is a front view showing the piston and the seal cap in a state where the inlet is closed, and FIG. 7*b* is a front view showing the piston and the seal cap in a state where the inlet is exposed.

Referring to FIGS. 6 and 7, if the pump assembly 1000 is pressurized, the stem 400 moves down. As the stem 400 moves down, the piston 200 coupled to the stem 400 and the first elastic member 600 supported against the underside of the stem 400 move down. In this case, the second elastic member 700 is compressed between the stem 400 and the cylinder cap 500 and starts to apply an elastic force in an upward direction thereof.

As the first elastic member 600 moves down, further, it pressurizes the seal cap 300 located on the underside thereof downward. As a result, the seal cap 300 moves down. In this case, the first elastic member 600 is compressed by means of the repulsive force generated by the downward pressurization for the seal cap 300, the increase of the internal pressure of the cylinder 100, and/or the frictional force between the seal cap 300 and the inner peripheral wall of the cylinder 100.

As the stem 400 moves down, the piston 200, the seal cap 300, and the first elastic member 600 move down together, and accordingly, the volume of the internal space of the cylinder 100 becomes reduced to increase the internal pressure of the cylinder 100.

In this case, since the stem 400 and the piston 200 are structurally coupled to each other, they move together, but since the stem 400 and the seal cap 300 are not structurally coupled to each other, they may not move together. That is, the piston 200 moves down by the same distance as the stem 400, but the seal cap 300 moves down by a shorter distance than the stem 400 by means of the compression of the first elastic member 600. Due to a difference between the downward movement distances of the piston 200 and the seal cap 300, the seal cap 300 moves up relative to the piston 200.

The seal cap 300 closes the inlet 210 at an initial state thereof, but as the seal cap 300 moves up relative to the piston 200, it exposes the inlet 210 to the outside. If the inlet 210 is exposed, the content of the cylinder 100 is introduced into the piston 200 through the inlet 210 by means of the increasing internal pressure of the cylinder 100, passes through the piston 200 and the stem 400, and is discharged to the outlet 411 of the stem 400.

After that, as the first elastic member 600 applies an elastic restoring force to the lower side thereof to the seal cap 300, the seal cap 300 moves down with respect to the stem 400 and thus closes the inlet 210 again.

Next, if the pressurized state of the pump assembly 1000 is released, the second elastic member 700 applies an elastic restoring force to the upper side thereof to the stem 400 to allow the stem 400 to move up. As the stem 400 moves up, the piston 200, the seal cap 300, and the first elastic member 600 move up together, If the piston 200, the seal cap 300, and the first elastic member 600 move up together, the volume of the internal space of the cylinder 100 becomes increased, and accordingly, a negative pressure is generated inside the cylinder 100 to allow the valve 800 to move up, so that the content of the container body is introduced into the cylinder 100.

The operations of the pump assembly 1000 as shown in FIGS. 6 and 7 are exemplary, and therefore, various operations may be performed according to embodiments of the present invention.

Figure 8:
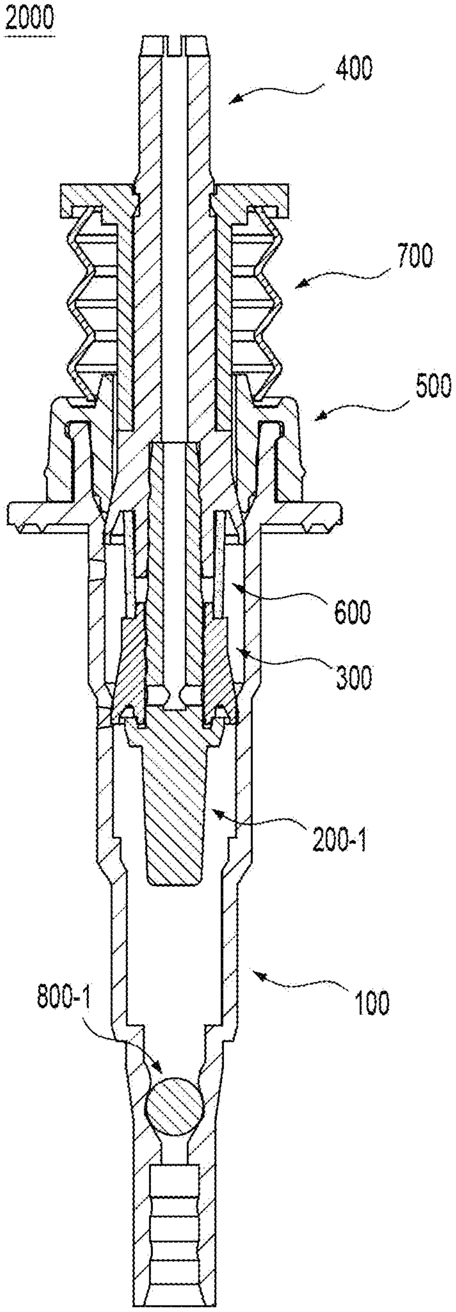
FIG. 8 is a sectional view showing a pump assembly according to another embodiment of the present invention.
Figure 9:
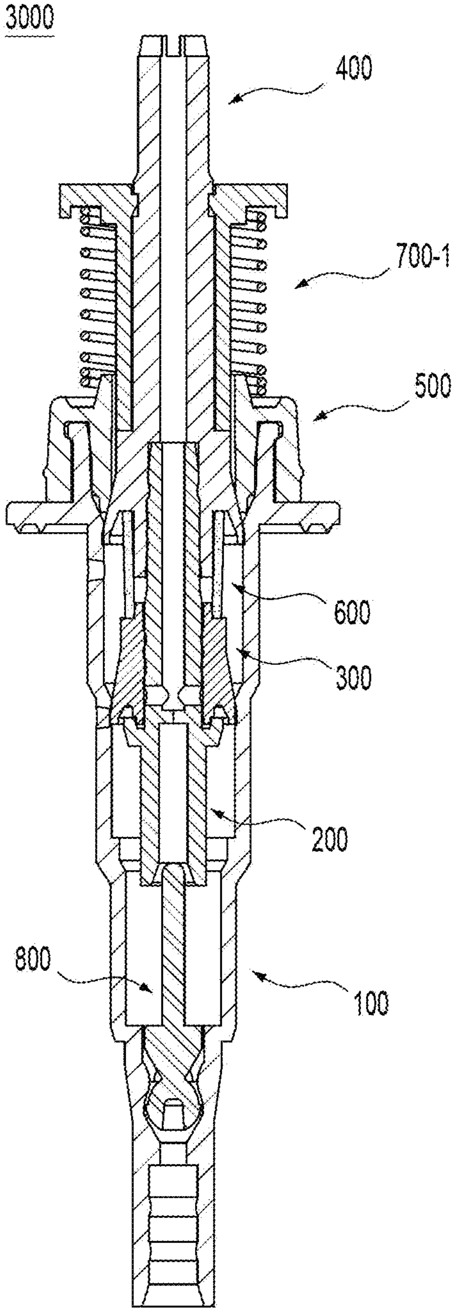
FIG. 9 is a sectional view showing a pump assembly according to yet another embodiment of the present invention.

FIGS. 8 and 9 are sectional views showing pump assemblies according to other embodiments of the present invention.

Referring to FIG. 8, a pump assembly 2000 according to another embodiment of the present invention has a valve 800-1 consisting of a spherical blocking ball. In this case, the valve 800-1 does not include any valve shaft and valve wings. The blocking ball is located on the suction port 110 of the cylinder 100 and moves up and down according to the changes in the internal pressure of the cylinder 100 to allow the suction port 110 to selectively communicate with the outside.

In the embodiment of the present invention, further, the blocking ball is made of a plastic material such as polypropylene (PP) and has the shape of a sphere by means of injection molding. However, the material and shape of the blocking ball are just exemplary, and therefore, the blocking ball may be made of a metal material or the like, without being limited thereto.

Referring next to FIG. 9, a pump assembly 3000 according to yet another embodiment of the present invention has a second elastic member 700-1 made of a metal material. For example, the second elastic member 700-1 is made of stainless steel, but of course, it may be made of various metal materials, without being limited thereto.

Figure 10:
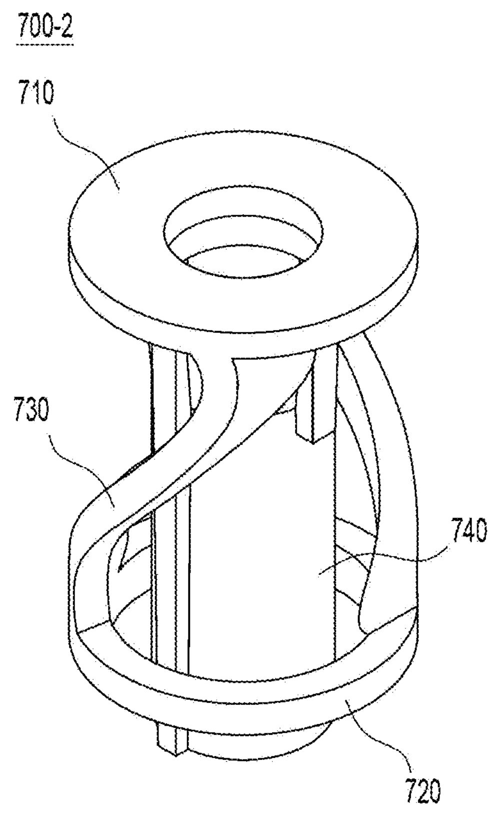
FIG. 10 is a perspective view showing another example of a second elastic member of the pump assembly according to the embodiment of the present invention.

FIG. 10 is a perspective view showing another example of the second elastic member of the pump assembly according to the embodiment of the present invention.

Referring to FIG. 10, a second elastic member 700-2 includes an upper support body 710, a lower support body 720, and elastic bodies 730.

The upper support body 710 supports tops of the elastic bodies 730. When the second elastic member 700-2 is pressurized, the upper support body 710 moves down to apply the pressurizing force to the elastic bodies 730, and if the pressurization is released, the upper support body 710 moves up by means of the elastic forces of the elastic bodies 730 and returns to its original state.

The lower support body 720 is located under the upper support body 710. The lower support body 720 supports undersides of the elastic bodies 730. The lower support body 720 is seated onto top of the cylinder cap 500 and does not move up and down, while supporting the elastic bodies 730, so that the elastic forces of the elastic bodies 730 are applied to the upper support body 710.

The upper support body 710 and the lower support body 720 have hollow portions formed therein to allow the stem 400 of the pump assembly to be located therein. For example, the upper support body 710 and the lower support body 720 each have the shape of a circular ring.

The elastic bodies 730 connect the upper support body 710 and the lower support body 720 to each other. When the second elastic member 700-2 is pressurized, the elastic bodies 730 are curvedly deformed to generate the elastic forces (that is, elastic compression). If the second elastic member 700-2 is released from the pressurized state, the curvedly deformed states of the elastic bodies 730 are released to return the elastic bodies 730 to their original state. In the embodiment of the present invention, at least one or more elastic bodies 730 are provided.

In the embodiment of the present invention, the second elastic member 700-2 is made of a soft plastic material. For example, the material of the second elastic member 700-2 includes polyetheretherketone (PEEK), polycarbonate (PC), polyoxymethylene (POM), polyketone (POK), polybutylene terephthalate (PBT), and the like. According to the embodiment of the present invention, further, the upper support body 710, the lower support body 720, and the elastic bodies 730 of the second elastic member 700-2 are formed unitarily with one another by means of injection molding, and otherwise, they may be separately made and coupled to one another.

In the embodiment of the present invention, the second elastic member 700-2 further includes a connector 740. The connector 740 extends downward from the inner periphery of the upper support body 710 by a given length and has a hollow portion formed up and down. In this case, the stem 400 does not include the support body 420, and the connector 740 is directly coupled to the stem body 410. For example, if the end periphery of the stem body 410 exposed to the outside of the cylinder cap 500 is inserted into the connector 740, the stem body 410 is fittedly inserted into the connector 740, and accordingly, the lower support body 720 is seated onto top of the cylinder cap 500, while the elastic bodies 730 surround the stem body 410 at the outside of the stem body 510.

In the embodiment of the present invention, further, the connector 740 is made of the same material as the upper support body 710, the lower support body 720, and the elastic bodies 730 and is formed unitarily therewith by means of injection molding.

As mentioned above, the preferred embodiment of the present invention has been disclosed in the specification and drawings. In the description of the present invention, special terms are used not to limit the present invention and the scope of the present invention as defined in claims, but just to explain the present invention. Therefore, persons skilled in the relevant art can appreciate that many modifications and variations are possible in light of the above teachings. It is therefore intended that the scope of the invention be limited not by this detailed description, but rather by the claims appended hereto.

The invention claimed is:

1. A pump assembly comprising:

a cylinder having a suction port defined at a lower end thereof;

a piston configured to ascend and descend inside the cylinder and having an inlet defined at one side thereof;

a seal cap configured to ascend and descend inside the cylinder, in while in close contact with an inner wall of the cylinder to open and close the inlet;

a stem coupled to the piston to be ascended and descended together with the piston and having an outlet defined at an upper end thereof;

a cylinder cap coupled to an upper side of the cylinder to surround the stem;

a first elastic member disposed between the seal cap and the stem inside the cylinder; and a second elastic member disposed between the cylinder cap and the stem outside the cylinder, wherein the first elastic member is an elastic body having a cylindrical shape with a hollow portion defined therethrough to surround at least one of the piston and the stem, and wherein, when the first elastic member is compressed, the first elastic member is configured to maintain a constant diameter at both longitudinal ends thereof and increase an internal diameter of a middle portion of the first elastic member.

2. The pump assembly according to claim 1, wherein if the pump assembly is pressurized, the second elastic member is compressed to allow the piston and the stem to move down, so that as the first elastic member is compressed, the seal cap moves up relative to the piston to allow the inlet to be exposed.

3. The pump assembly according to claim 1, wherein the first elastic member is made of at least one of thermoplastic polyolefin (TPO) and thermoplastic elastomer (TPE).

4. The pump assembly according to claim 1, wherein the second elastic member is a spring made of a plastic material by means of injection molding.

5. The pump assembly according to claim 4, wherein the second elastic member comprises:

an upper support body;

a lower support body located under the upper support body; and elastic bodies configured to connect the upper support body and the lower support body to each other, each elastic body having a given inclination and being curvedly deformable when the upper support body is pressurized.

6. The pump assembly according to claim 4, wherein the second elastic member is a bellows type elastic member whose peaks and troughs are alternatingly formed in a longitudinal direction thereof.

7. The pump assembly according to claim 6, wherein the stem comprises:

a stem body coupled to the cylinder and having the outlet formed on top thereof; and a support body coupled to an outer periphery of the stem body and having a stem wing extending outward therefrom to support top of the second elastic member.

8. The pump assembly according to claim 7, wherein the stem wing comprises at least one or more air entrance holes defined thereon to pass air therethrough when the second elastic member is compressed or decompressed.

9. The pump assembly according to claim 7, wherein the stem wing has a first support groove formed along a periphery of an underside thereof to support top of the second elastic member, and the cylinder cap has a second support groove formed along an upper periphery thereof to support underside of the second elastic member.

10. The pump assembly according to claim 1, further comprising a valve having a blocking ball located on the suction port to allow the suction port to selectively communicate with an outside.

11. The pump assembly according to claim 10, wherein the valve further comprises a valve shaft extending upward from the blocking ball, and the piston comprises a guide extending downward from an underside thereof, the guide having at least a portion passing therethrough in a longitudinal direction of the piston, wherein, when the piston or the valve is ascended and descended, the valve is inserted into the guide.

12. The pump assembly according to claim 11, wherein the valve further comprises at least one or more valve wings protruding outward from the valve shaft and configured to contact an inner peripheral wall of the cylinder and support a side periphery thereof.

13. The pump assembly according to claim 12, wherein the at least one or more valve wings are spaced apart from one another along a periphery of the valve shaft to move contents accommodated in container body through spaces thereamong.

14. A pump assembly comprising:

a cylinder having a suction port defined at a lower end thereof;

a piston configured to ascend and descend inside the cylinder and having an inlet defined at one side thereof;

a seal cap configured to ascend and descend inside the cylinder while in close contact with an inner wall of the cylinder to open and close the inlet;

a stem coupled to the piston to be ascended and descended together with the piston and having an outlet defined at an upper end thereof;

a cylinder cap coupled to an upper side of the cylinder to surround the stem;

a first elastic member disposed between the seal cap and the stem inside the cylinder; and a second elastic member disposed between the cylinder cap and the stem outside the cylinder, wherein the first elastic member is an elastic body having a cylindrical shape with a hollow portion defined therethrough to surround at least one of the piston and the stem, and wherein the first elastic member is made of at least one of thermoplastic polyolefin (TPO) and thermoplastic elastomer (TPE).

* * * * *